(12) United States Patent
Marlow (10) Patent No.: US 9,336,695 B2
(45) Date of Patent: May 10, 2016

(54) METHOD AND SYSTEM FOR PROVIDING CUSTOMIZED REGIONAL MAPS

(75) Inventor: Keith A. Marlow, Galston (AU)

(73) Assignee: Yahoo! Inc., Sunnyvale, CA (US)

( * ) Notice: Subject to any disclaimer, the term of this patent is extended or adjusted under 35 U.S.C. 154(b) by 1027 days.

(21) Appl. No.: 12/250,165

(22) Filed: Oct. 13, 2008

(65) Prior Publication Data

US 2010/0095231 A1 Apr. 15, 2010

(51) Int. Cl.
*G06F 3/048* (2013.01)
*G09B 29/00* (2006.01)

(52) U.S. Cl.
CPC ................... *G09B 29/008* (2013.01)

(58) Field of Classification Search
CPC .................................................. G09B 29/008
USPC ......................................................... 715/764
See application file for complete search history.

(56) References Cited

U.S. PATENT DOCUMENTS

| | | | | |
|---|---|---|---|---|
| 5,263,136 A * | 11/1993 | DeAguiar et al. | ............ | 345/538 |
| 5,549,332 A * | 8/1996 | Judson | ................. | G09B 29/004 283/117 |
| 5,948,040 A * | 9/1999 | DeLorme et al. | ............. | 701/426 |
| 5,968,109 A * | 10/1999 | Israni et al. | .................... | 701/532 |
| 6,009,403 A * | 12/1999 | Sato | ..................... | G01C 21/343 340/990 |
| 6,240,360 B1 * | 5/2001 | Phelan | .......................... | 701/438 |
| 6,305,396 B1 * | 10/2001 | Zheng | ........................... | 135/126 |
| 6,307,573 B1 * | 10/2001 | Barros | ........................... | 715/764 |
| 6,336,073 B1 * | 1/2002 | Ihara et al. | .................... | 701/533 |
| 6,397,143 B1 * | 5/2002 | Peschke | ....................... | 701/432 |
| 6,469,710 B1 * | 10/2002 | Shum et al. | .................... | 345/619 |
| 6,484,094 B1 * | 11/2002 | Wako | ............................. | 701/438 |
| 6,526,351 B2 * | 2/2003 | Whitham | ....................... | 701/438 |
| 6,724,382 B2 * | 4/2004 | Kenyon et al. | ................. | 345/419 |
| 7,158,878 B2 * | 1/2007 | Rasmussen et al. | .......... | 701/431 |
| 7,187,997 B2 * | 3/2007 | Johnson | ........................ | 700/245 |
| 7,197,718 B1 * | 3/2007 | Westerman et al. | .......... | 715/801 |
| 7,274,378 B2 * | 9/2007 | McAvoy et al. | ............... | 345/629 |
| 7,315,259 B2 * | 1/2008 | Sacks | .......................... | 340/995.1 |
| 7,373,244 B2 * | 5/2008 | Kreft | ............................. | 701/532 |
| 7,379,811 B2 * | 5/2008 | Rasmussen et al. | .......... | 701/532 |
| 7,386,396 B2 * | 6/2008 | Johnson | ........................ | 701/300 |
| 7,555,725 B2 * | 6/2009 | Abramson et al. | ............ | 715/781 |
| 7,599,790 B2 * | 10/2009 | Rasmussen et al. | .......... | 701/532 |

(Continued)

OTHER PUBLICATIONS

International Search Report (PCT/US2009/060215) dated Jun. 7, 2010; 3 pages.

*Primary Examiner* — Jung-Mu Chuang
(74) *Attorney, Agent, or Firm* — James J. DeCarlo; Greenberg Traurig, LLP (57) ABSTRACT

A method for customizing a map is provided. The method includes receiving a query for a portion of a map, and determining a predetermined region of interest (ROI) map tile included in the portion of the map. The predetermined ROI map tile indicates information associated with a category. The method further includes providing the predetermined ROI map tile for displaying to a user. Further, an apparatus for customizing maps is provided. The apparatus includes a movement event processor for receiving a query for a portion of a map, and a Region of Interest (ROI) selector for determining a predetermined region of interest (ROI) map tile included in the portion of the map. The predetermined ROI map tile indicates information associated with a category. The apparatus further includes a map tile layout generator for providing the predetermined ROI map tile for displaying to a user.

25 Claims, 6 Drawing Sheets

(56) References Cited

U.S. PATENT DOCUMENTS

| | | | |
|---|---|---|---|
| 7,616,217 B2* | 11/2009 | Dayan et al. | 345/619 |
| 7,792,858 B2* | 9/2010 | Tang | G06F 17/30864 707/709 |
| 7,890,257 B2* | 2/2011 | Fyke et al. | 701/431 |
| 7,894,984 B2* | 2/2011 | Rasmussen et al. | 701/452 |
| 7,945,546 B2* | 5/2011 | Bliss et al. | 707/705 |
| 7,945,852 B1* | 5/2011 | Pilskalns | 715/230 |
| 8,014,946 B2* | 9/2011 | Rasmussen et al. | 701/439 |
| 8,041,506 B2* | 10/2011 | Bliss et al. | 701/443 |
| 8,130,245 B2* | 3/2012 | Ham et al. | 345/660 |
| 8,244,770 B2* | 8/2012 | Turner et al. | 707/796 |
| 8,504,945 B2* | 8/2013 | Jakobson et al. | 715/855 |
| 8,571,580 B2* | 10/2013 | Altman et al. | 455/456.3 |
| 8,937,627 B1* | 1/2015 | Otero et al. | 345/619 |
| 2002/0156917 A1* | 10/2002 | Nye | H04L 63/104 709/238 |
| 2004/0204821 A1* | 10/2004 | Tu | 701/200 |
| 2004/0243306 A1* | 12/2004 | Han | 701/211 |
| 2005/0222765 A1* | 10/2005 | Kobuya | G01C 21/20 701/426 |
| 2005/0270299 A1* | 12/2005 | Rasmussen | G01C 21/32 345/552 |
| 2006/0010100 A1* | 1/2006 | McAvoy et al. | 707/2 |
| 2006/0136090 A1* | 6/2006 | Koromyslov et al. | 700/200 |
| 2006/0156228 A1* | 7/2006 | Gallo et al. | 715/523 |
| 2006/0167629 A1* | 7/2006 | Ishii et al. | 701/211 |
| 2006/0200308 A1* | 9/2006 | Arutunian | G06Q 30/00 701/532 |
| 2006/0206264 A1* | 9/2006 | Rasmussen | 701/212 |
| 2006/0241859 A1* | 10/2006 | Kimchi | G01C 21/26 701/532 |
| 2007/0027621 A1* | 2/2007 | Operowsky et al. | 701/210 |
| 2007/0096945 A1* | 5/2007 | Rasmussen | G01C 21/32 340/995.1 |
| 2007/0118520 A1* | 5/2007 | Bliss et al. | 707/5 |
| 2007/0171451 A1* | 7/2007 | Borchers | G06K 15/02 358/1.13 |
| 2007/0176796 A1* | 8/2007 | Bliss et al. | 340/995.14 |
| 2007/0282792 A1* | 12/2007 | Bailly et al. | 707/2 |
| 2007/0291034 A1* | 12/2007 | Dones | G06T 19/003 345/427 |
| 2008/0068151 A1* | 3/2008 | Ouzana et al. | 340/521 |
| 2008/0068380 A1* | 3/2008 | McAvoy et al. | 345/428 |
| 2008/0109159 A1* | 5/2008 | Shi et al. | 701/208 |
| 2008/0174593 A1* | 7/2008 | Ham et al. | 345/418 |
| 2008/0189249 A1* | 8/2008 | Petakov et al. | 707/3 |
| 2008/0292213 A1* | 11/2008 | Chau | 382/294 |
| 2008/0301643 A1* | 12/2008 | Appleton et al. | 717/124 |
| 2009/0006994 A1* | 1/2009 | Forstall et al. | 715/764 |
| 2009/0024476 A1* | 1/2009 | Baar | G06Q 30/02 705/14.53 |
| 2009/0100018 A1* | 4/2009 | Roberts | 707/3 |
| 2009/0132941 A1* | 5/2009 | Pilskalns et al. | 715/764 |
| 2009/0183083 A1* | 7/2009 | Hedges | 715/738 |
| 2009/0198767 A1* | 8/2009 | Jakobson et al. | 709/203 |
| 2010/0002012 A1* | 1/2010 | Andreasson | 345/619 |
| 2010/0005053 A1* | 1/2010 | Estes | 707/1 |
| 2010/0122208 A1* | 5/2010 | Herr et al. | 715/799 |
| 2010/0268455 A1* | 10/2010 | Dorfman | G01C 21/20 701/533 |
| 2011/0276591 A1* | 11/2011 | Bliss et al. | 707/769 |
| 2012/0303263 A1* | 11/2012 | Alam et al. | 701/410 |
| 2012/0303264 A1* | 11/2012 | Su et al. | 701/416 |
| 2012/0303265 A1* | 11/2012 | Su et al. | 701/419 |
| 2012/0303266 A1* | 11/2012 | Su et al. | 701/420 |
| 2012/0303270 A1* | 11/2012 | Su et al. | 701/431 |
| 2012/0303274 A1* | 11/2012 | Su et al. | 701/533 |

* cited by examiner

METHOD AND SYSTEM FOR PROVIDING CUSTOMIZED REGIONAL MAPS

BACKGROUND OF THE INVENTION

Computerized online mapping systems are becoming increasingly popular for mapping locations requested by a user. These Internet websites for mapping are useful for mapping a requested location, for example. These websites typically allow a user to input a query of a requested location so that a map associated with the requested location may be provided to the user.

As another example, these mapping websites facilitate travel planning. The user may enter a start point and an end point for travel, which are then used to calculate and provide travel directions to the user. Travel directions may include the routes to take and an estimated time for arrival.

These types of mapping systems require a user interface for a user to enter in a request for a map, and an interface where the map is provided for displaying to the requesting user.

Figure 1:
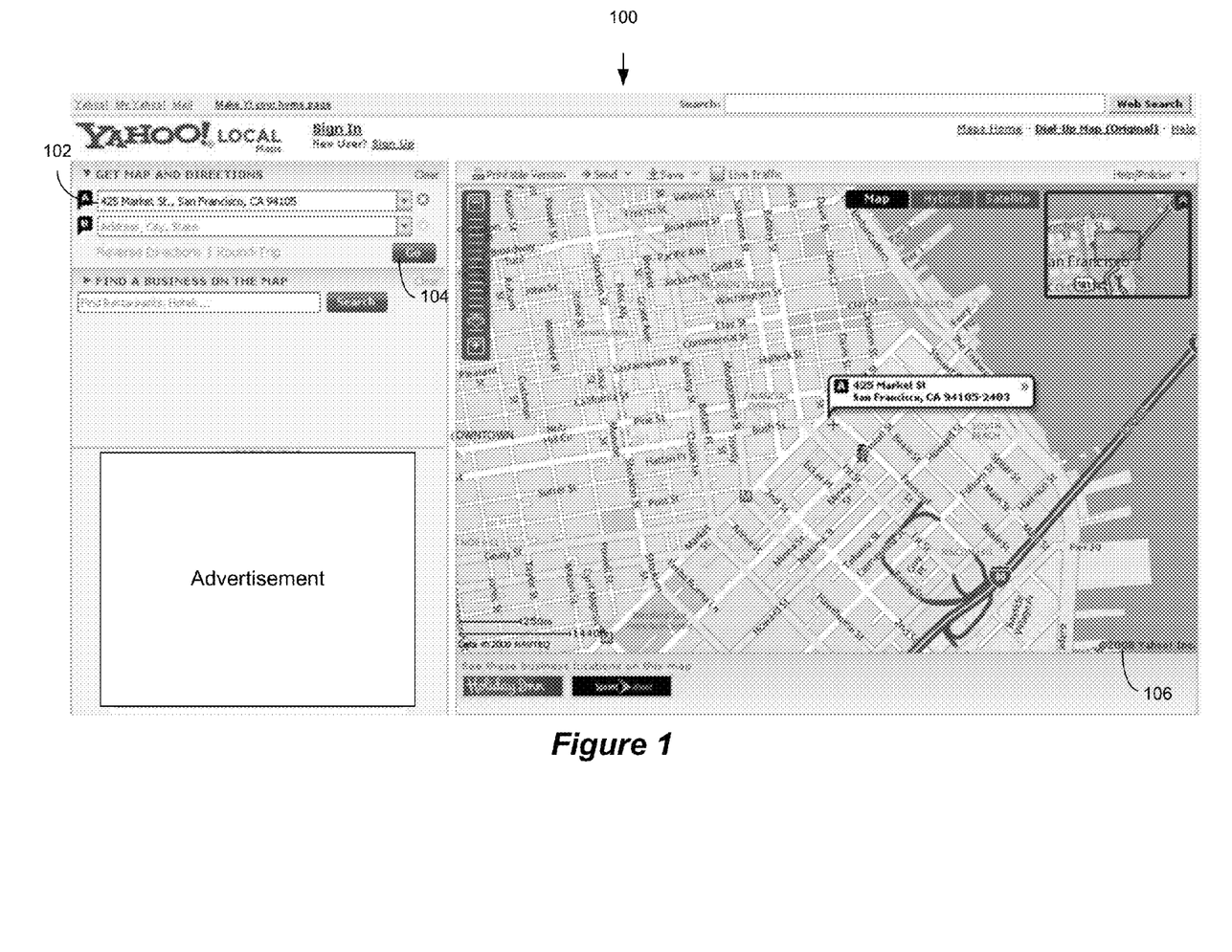
FIG. 1 illustrates a general user interface for a user to request a map.

A general user interface 100 for a mapping website is illustrated in FIG. 1. The user may enter in the address of the desired location as a request in an entry box 100. As shown, a user has entered a desired location of 425 Market St., San Francisco, Calif. 94105. After entering the desired location to be mapped, as shown in FIG. 1, the user then requests a map (typically from a remote server) by selecting a button for submitting the request to a map server 104. A map image is then typically generated at the remote server, transmitted to the user's computing device, and eventually displayed on the web browser user interface in a map display web page 106.

The map image may be composed of map tiles that are pre-generated. Typically, pre-generated map tiles fall into the categories of: vector/text tiles for roads/names/POI; rastor images (e.g., satellite images); and transparent overlays (e.g., roads over a satellite image).

In a mapping system, generally the same type, or category, of pre-generated map tiles are used. For example, the same vector style is used for maps of San Francisco and maps of New York or London. In this way, the initial generation of a map is simpler for the presentation of information such as roads.

However, a user may often want more information displayed in the map than the information of the pre-generated map tile. For example, if the user is interested in viewing more information, such as walking paths, in the requested map location, the desired information may no be available. Furthermore, if a map tile is pre-generated to include other desired information, the contextual focus of the map becomes confusing and difficult to comprehend.

Therefore, it is important to recognize different users may want to view maps for different purposes, thus requiring other significant information in a map associated with the desired purpose.

For example, a user who drives a car for commuting may care about road directions, road classes, and road restrictions. In another example, a user who enjoys walking around town may desire information associated with points of interest, walking paths, places to sit, places to eat, etc.

Therefore, methods and systems for providing customized map tiles are desired.

BRIEF SUMMARY OF THE INVENTION

In accordance with embodiments of the present invention, a method for customizing a map is provided. The method includes receiving a query for a portion of a map, and determining a predetermined region of interest (ROI) map tile included in the portion of the map. The predetermined ROI map tile indicates information associated with a category. The method further includes providing the predetermined ROI map tile for displaying to a user.

Further, in accordance with embodiments of the present invention, a computer-readable medium encoded with executable instructions for customizing a map is provided. The instructions include instructions for receiving a query for a portion of a map, and determining a predetermined region of interest (ROI) map tile included in the portion of the map. The predetermined ROI map tile indicates information associated with a category. The instructions further include instructions for providing the predetermined ROI map tile for displaying to a user.

Moreover, in accordance with embodiments of the present invention, an apparatus for customizing maps is provided. The apparatus includes a movement event processor for receiving a query for a portion of a map, and a Region of Interest (ROI) selector for determining a predetermined region of interest (ROI) map tile included in the portion of the map. The predetermined ROI map tile indicates information associated with a category. The apparatus further includes a map tile layout generator for providing the predetermined ROI map tile for displaying to a user.

Other features and aspects of the invention will become apparent from the following detailed description, taken in conjunction with the accompanying drawings which illustrate, by way of example, the features in accordance with embodiments of the invention. The summary is not intended to limit the scope of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

According to embodiments of the invention, map tiles for specific regions of interest are provided. This provides an extended set of map tile styles customized for specific usage cases, such as map tiles that show specific features of interests. These customized map tiles are described as Region of Interest (ROI) map tiles.

As opposed to overlaying the features of interest on top of a base map tile that may already show many other features or information, some of which may be extraneous information for a user with a specific interest, according to embodiments of the invention, a separate set of map tiles (ROI map tiles) showing the features of interest are generated. In this way, the ROI map tiles can be swapped for the base tiles corresponding to the same location.

A bounding latitude/longitude box of a ROI map tile is already known. Similarly, the zoom ranges used in a mapping system are also known. This allows the ROI map tiles to be pre-generated in any pre-determined ROI style.

In contrast to map systems that overlay information over base map tiles, because the bounding latitude/longitude box of the ROI map tiles are known, the system can derive the map portion associated with each ROI map tile. Therefore, if the requested map portion includes a ROI map tile, then it can be provided to the user. The front end server may periodically query the back end server to determine if ROI map tiles are associated with the requested map portion.

By customizing maps in this way, source data needed for generation of map tiles does not need to be communicated to the client browser. For example, latitude/longitude information is not known to the browser.

This makes it possible for browsers of different complexities to be able to display customized maps to users, e.g., displaying a customized map to a user on a mobile phone browser or at a desktop computer browser.

The pre-generation of tiles at a server also allows for the ease of adding other map tile styles to the customization options. The whole map system platform would not have to be modified if local markets wanted to add in tile styles more appropriate to local usage situations, for example.

Several styles of ROI map tiles are possible. An example of a ROI style is a tourist view, which may emphasize landmarks, hotels, and restaurants. Another possible ROI style is a commuter view, which may emphasize public transportation options available in the requested map portion.

Figure 2:
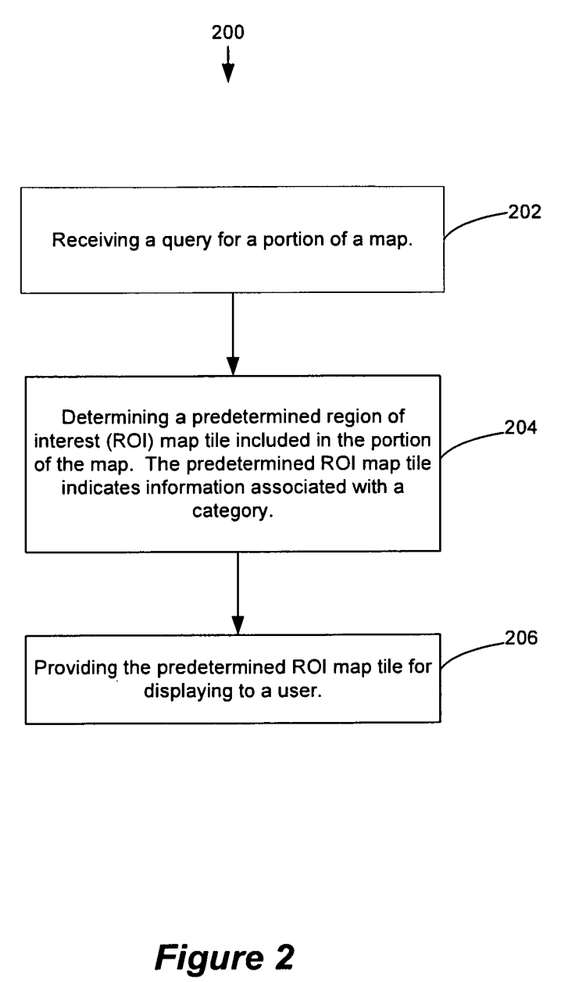
FIG. 2 illustrates a flowchart of a method for providing customized regional maps to a user according to embodiments of the invention.

FIG. 2 illustrates a method 200 for customizing a map with ROI map tiles, according to embodiments of the invention. The method includes receiving a query for a portion of a map from a user 202. It is determined if a predetermined region of interest map tile is included in the portion of the map indicated in the query 204. The predetermined ROI map tile indicates information associated with a category. The category may be determined by a desired map style.

A map style may be tourist views, for example. The tourist style ROI map tiles may include information such as hotels, restaurants, tourist attractions, and public transportation information, for example.

The predetermined ROI map tile is provided for displaying to a user 206. The ROI map tile is provided in place of a base map tile in generating the requested portion of the map.

Figure 3:
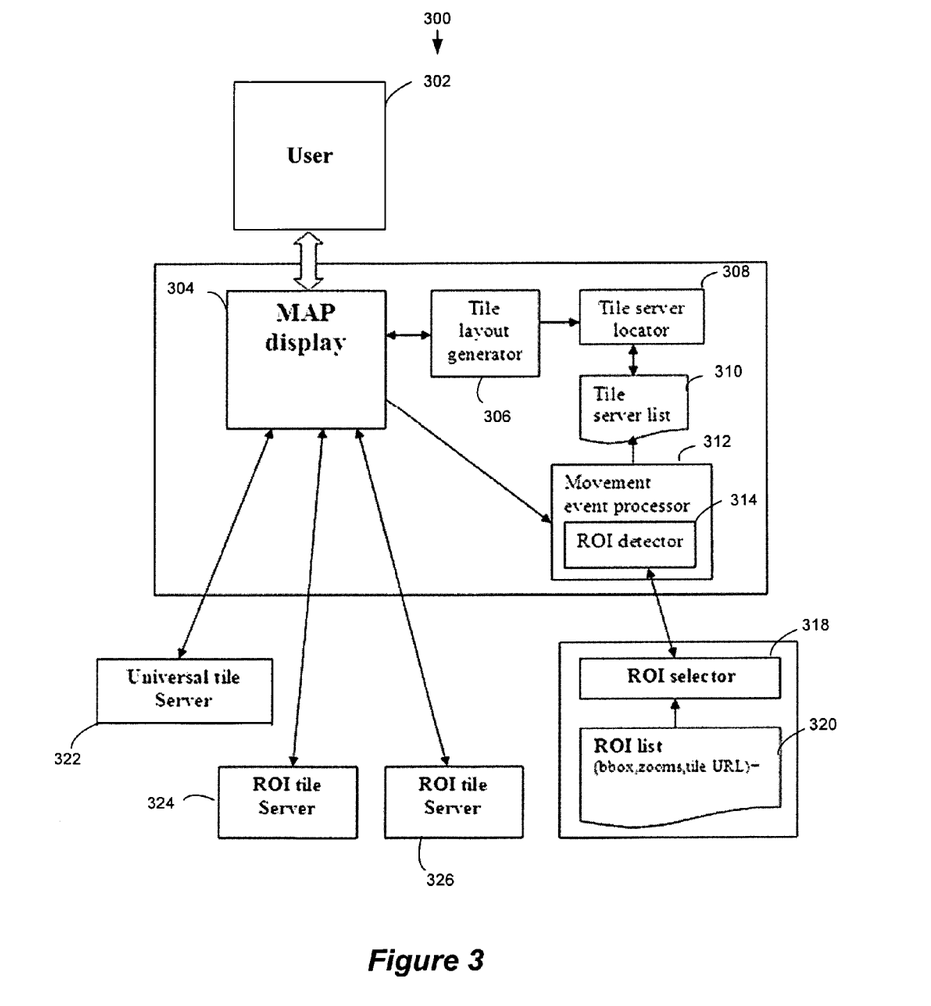
FIG. 3 illustrates a system for providing customized regional maps according to embodiments of the invention.

FIG. 3 illustrates a system for customizing maps according to embodiments of the invention. A user 302 may be viewing map provided by the map display 304. The requested portion of the map changes as the user 302 changes the portion of map they are viewing. For example, the user 302 may wish to view another area of the map that is displayed and scroll to the different position, thereby requesting a different portion of a map.

As the user 302 scrolls around a map, refresh and movement events are generated. The generated refresh and movement events initiate a map request query to a movement event processor 312. In other words, as the user 302 navigates navigation around the map, at certain intervals, a map request query is sent to a the movement event processor 312 to see if any ROI map tiles have been generated for the requested portion of the map. In embodiments of the invention, the map portion query is generated in response to a movement event of 0.1 degrees.

The movement event processor includes a ROI detector 314. The ROI detector 314 determines if any ROI map tiles are associated with the requested map portion. The requested map portion based on the navigation of the map by the user 302 is compared with the available pre-generated ROI map tiles indicated by the ROI list 320. The ROI list may include information such as bounding latitude/longitude box, zoom ranges, and associated URLs for each ROI map tile.

If the requested portion includes available ROI map tiles, the user 302 may be given the option to confirm that the ROI map tiles should be used to generate the map. The option for the user 302 to confirm the ROI map tiles may be provided to the user 302 in a pop-up window, for example.

There may be one or more ROI map tiles styles associated with a requested map portion. If the user 302 confirms the use of a ROI map tile style, then for the region of the portion of the map where ROI map tiles of the selected ROI map tile style are available are provided for display to the user 302 instead of the base map tiles. The ROI selector 318 selects the appropriate ROI map tiles.

The local Tile Server list 310 is updated with the selected ROI map tiles to indicate which tile server is associated with the determine ROI map tiles. This way, when the map tile layout needs to be regenerated, the right tile servers are selected and the necessary tile servers are enabled for the selected ROI map tiles.

There may be a plurality of tile servers for providing ROI map tiles, such as tile server 324 and tile server 326. The tile servers 324 and 326 host ROI map tiles in separately addressable locations.

The map is generated with base map tiles stored in the universal tile server 322, and any ROI map tiles stored in tile servers 324 or 326, for example.

Figure 4:
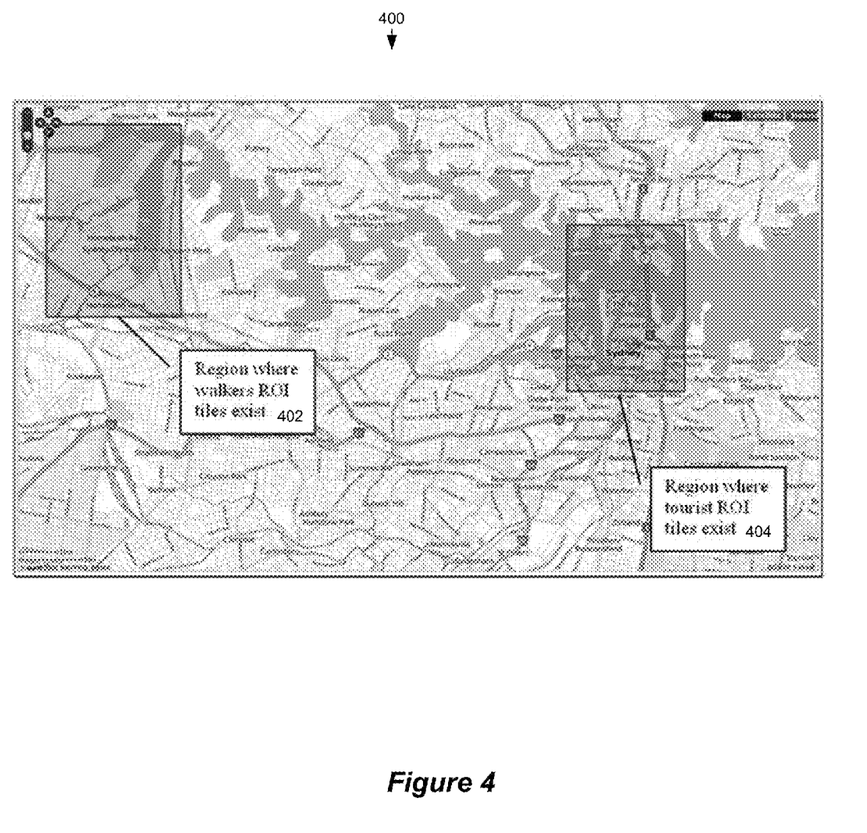
FIG. 4 illustrates an example of a map including portions that are associated with pre-generated region-of-interest map tiles according to embodiments of the invention.
Figure 5:
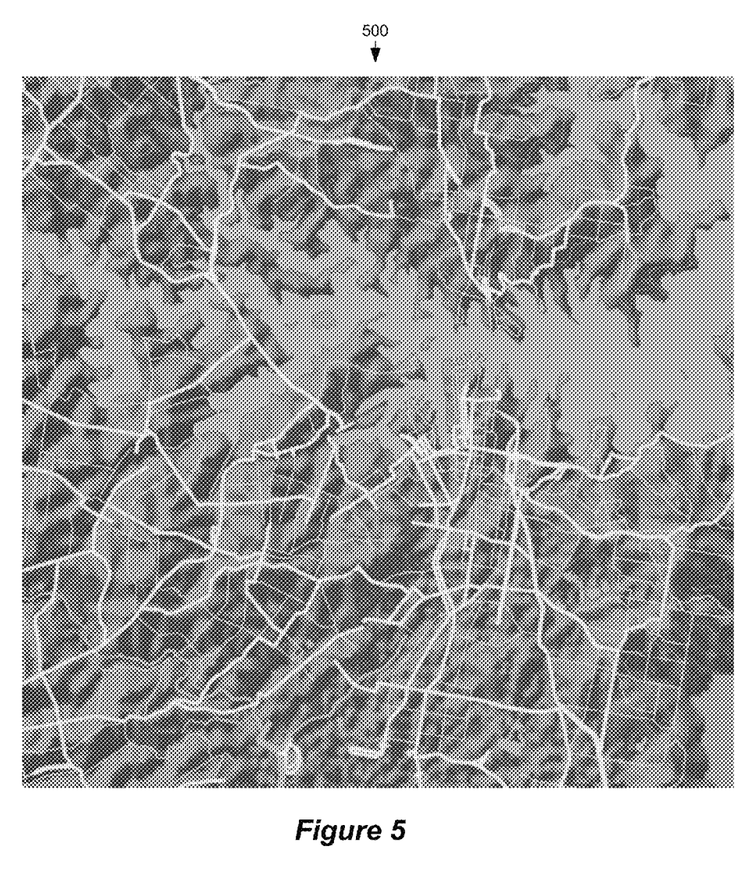
FIG. 5 illustrates an example of a customized map including region-of-interest map tiles according to embodiments of the invention.

FIG. 4 illustrates a map 400 of Sydney, Australia indicating regions of the map where pre-generated ROI map tiles are available, according to embodiments of the invention. In region 402, there are available ROI map tiles of a style that include pedestrian interests. Pedestrian interests that may be indicated on this style of ROI map tile may be indications of walking paths, hiking trails, places to sit, and interesting landmarks. In another example, region 404 may include ROI map tiles for a style for tourists. The features included in these ROI map tiles directed towards tourist, may include indications of hotels, restaurants, museums, public transportation indicators, and tourist destinations As another example according to embodiments of the invention, a topological map 500 of Sydney is illustrated in FIG. 5. A user interested in hiking may have selected a ROI map tile style that indicates the topology of a region so that the expected difficulty of a particular hiking trail is illustrated on the map.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
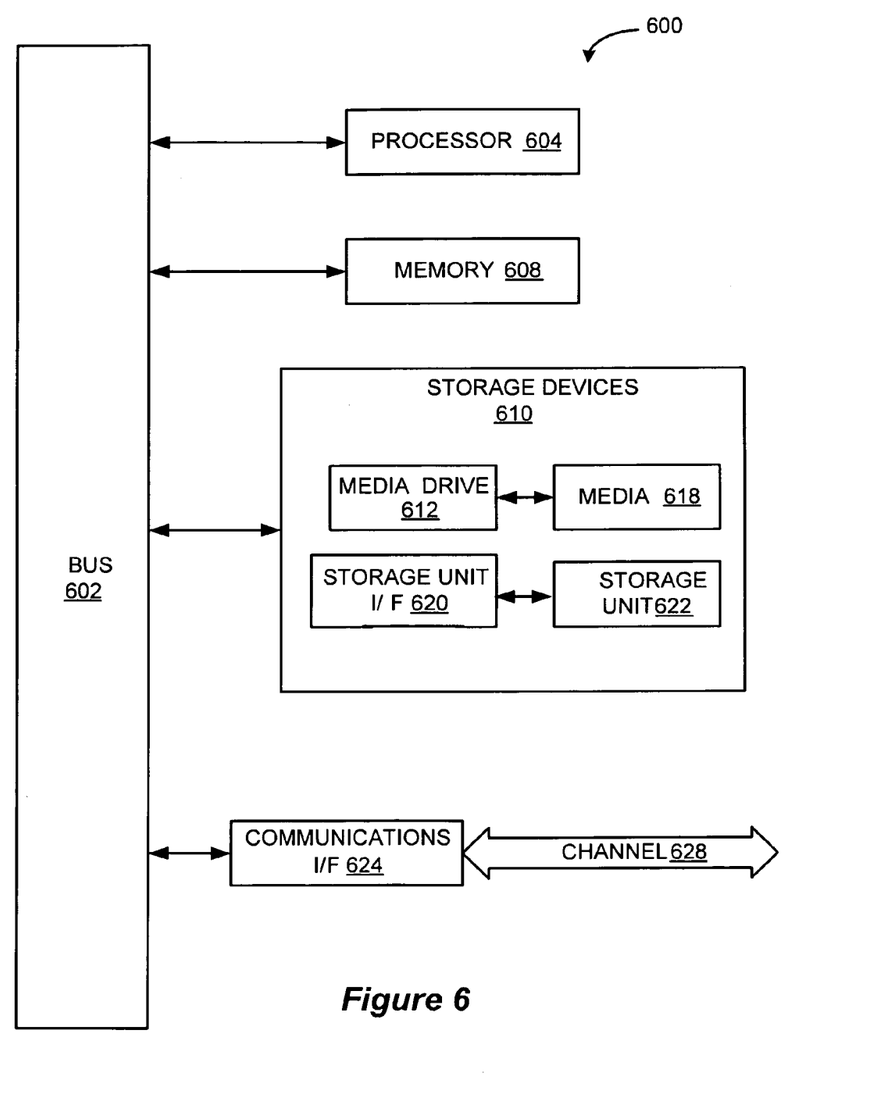
FIG. 6 illustrates a block diagram of a computing system according to embodiments of the invention.

FIG. 6 illustrates an exemplary computing system 600 that may be employed to implement processing functionality for various aspects of the invention (e.g., as a server device, client device, database, presence platform, combinations thereof, and so on). Those skilled in the relevant art will also recognize how to implement the invention using other computer systems or architectures. Computing system 600 may represent, for example, a desktop, mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, for example random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
receiving, by a server computing device via an electronic communications network and from a client device's user interface including a map display, a query requesting a new map display, the requested new map display comprising a plurality of base tiles;
identifying, by the server computing device, a plurality of predetermined region of interest (ROI) map tiles associated with the requested new map display, each predetermined ROI map tile comprising a respective base tile customized to include information associated with a respective user interest category of a plurality of different user interest categories, the each predetermined ROI map tile may be used as a replacement for the respective base tile in the new map display, each user interest category of the plurality of different user interest categories having a number of associated predetermined ROI map tile replacements for a corresponding number of the base tiles to include at least one feature of interest specific to the each user interest category in the new map display;
replacing, by the server computing device before serving the new map display to the client device, each of a selected number of the base tiles in the new map display with a corresponding selected one of the predetermined ROI map tiles associated with the respective user interest category of the plurality of different user interest categories to customize the new map display to include the respective user interest category's associated information comprising the at least one feature of interest specific to the respective user interest category; and
serving, by the server computing device to the client computing device via the electronic communications network, in response to the query, the new map display for display by the user interface at the client device, the served new map display comprising both base tiles which are not replaced by any of the predetermined ROI map tiles and the selected number of the predetermined ROI map tiles replacing the selected number of base tiles in the new map display.

2. The method of claim 1, wherein the predetermined ROI map tiles are associated with a bounding latitude/longitude box.

3. The method of claim 1, wherein the predetermined ROI map tiles are associated with a plurality of zoom ranges.

4. The method of claim 1, wherein providing the predetermined ROI map tile for displaying to the user further comprises providing the predetermined ROI map tile along with at least one base tile for displaying to the user.

5. The method of claim 1, wherein one user interest category of the plurality relates to tourist interests.

6. The method of claim 1, wherein one user interest category of the plurality relates to commuter views.

7. The method of claim 1, wherein one user interest category of the plurality relates to topology of routes of interest to walkers.

8. The method of claim 1, further comprising providing a visual indication to the user in response to identifying the predetermined ROI map tiles.

9. A computer-readable non-transitory medium storing executable instructions thereon, the instructions comprising instructions for:
receiving, by a server computing device via an electronic communication network and from a client device's user interface including a map display, a query requesting a new map display, the requested new map display comprising a plurality of base tiles;
identifying, by the server computing device, a plurality of predetermined region of interest (ROI) map tiles associated with the requested new map display, each predetermined ROI map tile comprising a respective base tile customized to include information associated with a respective user interest category of a plurality of different user interest categories, the each predetermined ROI map tile may be used as a replacement for the respective base tile in the new map display, each user interest category of the plurality of different user interest categories having a number of associated predetermined ROI map tile replacements for a corresponding number of the base tiles to include at least one feature of interest specific to the each user interest category in the new map display;
replacing, by the server computing device before serving the new map display to the client device, each of a selected number of the base tiles in the new map display with a correspond selected one of the predetermined ROI map tiles associated with the respective user interest category of the plurality of different user interest categories to customize the new map display to include the respective user interest category's associated information comprising the at least one feature of interest specific to the respective user interest category; and
serving, by the server computing device to the client computing device via the electronic communications network, in response to the query, the new map display for display by the user interface at the client device, the served new map display comprising both base tiles which are not replaced by any of the predetermined ROI map tiles and the selected number of the predetermined ROI map tiles replacing the selected number of base tiles in the new map display.

10. The computer-readable medium of claim 9, wherein the predetermined ROI map tiles are associated with a bounding latitude/longitude box.

11. The computer-readable medium of claim 9, wherein the predetermined ROI map tiles are associated with a plurality of zoom ranges.

12. The computer-readable medium of claim 9, wherein the instructions for providing the predetermined ROI map tile for displaying to the user further comprises instructions for providing the predetermined ROI map tile along with at least one base tile for displaying to the user.

13. The computer-readable medium of claim 9, wherein one user interest category of the plurality relates to tourist interests.

14. The computer-readable medium of claim 9, wherein one user interest category of the plurality relates to commuter views.

15. The computer-readable medium of claim 9, wherein one user interest category of the plurality relates to topology of routes of interest to walkers.

16. The computer-readable medium of claim 9, wherein the instructions further comprise instructions for providing a visual indication to the user in response to determining a predetermined ROI map tile.

17. An apparatus comprising:
at least one computing device, each computing device comprising a processor and a storage medium for tangibly storing thereon program logic for execution by the processor, the stored program logic comprising:
receiving logic executed by the processor for receiving, by a server computing device via an electronic communications network and from a client device's user interface including a map display, a query requesting a new map display, the requested new map display comprising a plurality of base tiles;
identifying logic executed by the processor for identifying, by the server computing device, a plurality of predetermined region of interest (ROI) map tiles associated with the requested new map display, each predetermined ROI map tile comprising a respective base tile customized to include information associated with a respective user interest category of a plurality of different user interest categories, the each predetermined ROI map tile may be used as a replacement for the respective base tile in the new map display, each user interest category of the plurality of different user interest categories having a number of associated predetermined ROI map tile replacements for a corresponding number of the base tiles to include at least one feature of interest specific to the each user interest category in the new map display; and
replacing logic executed by the processor for replacing, by the server computing device before serving the new map display to the client device, each of a selected number of the base tiles in the new map display with a corresponding selected one of the predetermined ROI map tiles associated with the respective user interest category of the plurality of different user interest categories to customize the new map display to include the respective user interest category's associated information comprising the at least one feature of interest that specific to the respective user interest category; and
serving logic executed by the at least one processor for serving, by the server computing device to the client computing device via the electronic communications network, in response to the query, the new map display for display by the user interface at the client device, the served new map display comprising both base tiles which are not replaced by any of the predetermined ROI map tiles and the selected number of the predetermined ROI map tiles replacing the selected number of base tiles in the new map display.

18. The apparatus of claim 17, the stored program logic further comprising:
receiving logic executed by the processor for receiving the predetermined ROI map tiles.

19. The apparatus of claim 18, the stored program logic further comprising:
storing logic executed by the processor for storing a map tile server list, the map tile server list including information related to the predetermined ROI map tiles.

20. The apparatus of claim 17, the stored program logic further comprising:
receiving logic executed by the processor for receiving a base map tile, wherein the base map tile is provided along with the selected predetermined ROI map tile for displaying to the user.

21. The apparatus of claim 17, wherein the predetermined ROI map tiles are each associated with a respective bounding latitude/longitude box.

22. The apparatus of claim 17, the stored program logic further comprising:
storing logic executed by the processor for storing information related to a bounding latitude/longitude box and a plurality of zoom ranges associated with the predetermined ROI map tiles.

23. The apparatus of claim 17, wherein the ROI selector comprises logic for selecting the predetermined ROI map tile based on the respective user interest category.

24. The apparatus of claim 17, the map comprises a plurality of portions and a subset of the plurality of map tiles are provided for display to the user in place of the map.

25. The apparatus of claim 24, at least two tiles of the subset of map tiles provided for display to the user are associated with at least two user interest categories of the plurality.

* * * * *